United States Patent [19]

van Dongeren

[11] 4,390,383

[45] Jun. 28, 1983

[54] METHOD OF MAKING PLASTIC PIPES HAVING WALLS WITH LENGTHWISE EXTENDING CHANNELS

[75] Inventor: Jan P. van Dongeren, Bergentheim, Netherlands

[73] Assignee: Wavin B.V., Zwolle, Netherlands

[21] Appl. No.: 247,364

[22] Filed: Mar. 25, 1981

Related U.S. Application Data

[60] Division of Ser. No. 904,218, May 9, 1978, Pat. No. 4,280,534, and a continuation of Ser. No. 728,117, Sep. 30, 1976, abandoned.

[30] Foreign Application Priority Data

Oct. 3, 1975 [NL] Netherlands .......................... 7511693

[51] Int. Cl.³ .......................... B29C 11/00; F16L 9/18
[52] U.S. Cl. ..................................... 156/196; 138/109; 138/115; 138/148; 138/172; 156/198; 156/293; 156/294; 156/304.2; 156/304.5; 156/304.6; 156/308.2; 264/310; 264/322; 285/133 R; 285/137 R; 285/138; 285/288

[58] Field of Search ................... 285/133 R, 138, 423, 285/137 R, 31, 284, 286, 288, 344; 138/109, 148, 111, 115, 148, 150, 172; 156/60, 149, 245, 196, 198, 212, 293, 294, 304.2, 304.5, 304.6, 308.2; 264/310, 319, 322

[56] References Cited

U.S. PATENT DOCUMENTS

| 1,218,895 | 3/1917 | Porter ............................ 285/138 X |
| 1,746,132 | 2/1930 | Stokes ............................ 285/138 X |
| 2,126,075 | 8/1930 | Wright ........................... 285/138 X |
| 3,217,077 | 11/1965 | Colke ............................. 138/109 X |
| 3,725,522 | 4/1973 | Sheridan et al. .................... 264/322 |
| 3,895,830 | 7/1975 | Mudlem ...................... 285/137 R X |
| 4,085,185 | 4/1978 | Adair ................................. 156/245 |

FOREIGN PATENT DOCUMENTS

| 269908 | 5/1913 | Fed. Rep. of Germany ...... 138/148 |
| 54-103480 | 8/1979 | Japan .................................. 156/258 |

*Primary Examiner*—Caleb Weston
*Attorney, Agent, or Firm*—Wigman & Cohen

[57] ABSTRACT

Plastic pipes comprising an inner and outer wall being interconnected by lengthwise extending connecting partitions, forming channels, the ends of the channels being each separately sealed by sealingly pressing the end walls of a channel to each other after these walls have been heated to a temperature surpassing the plasticizing temperature.

9 Claims, 9 Drawing Figures

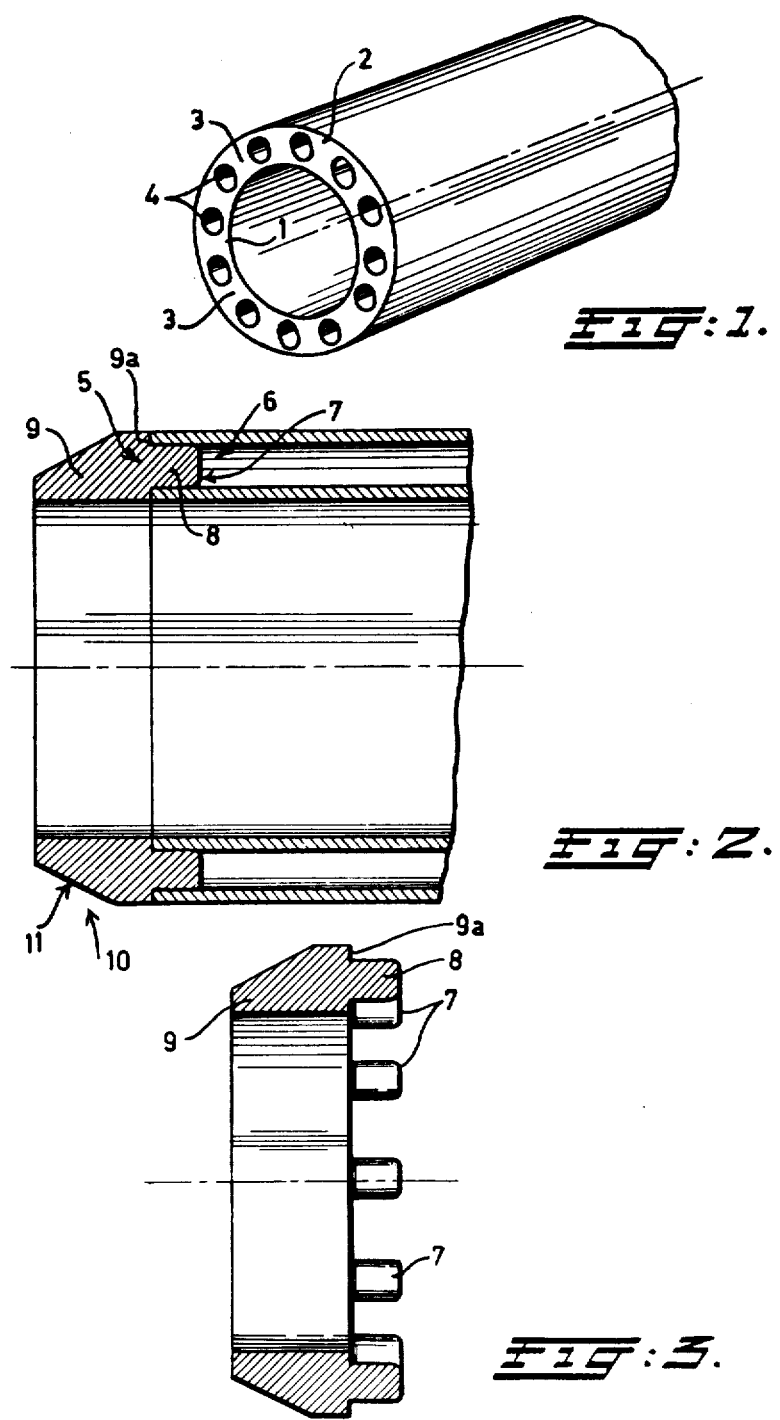

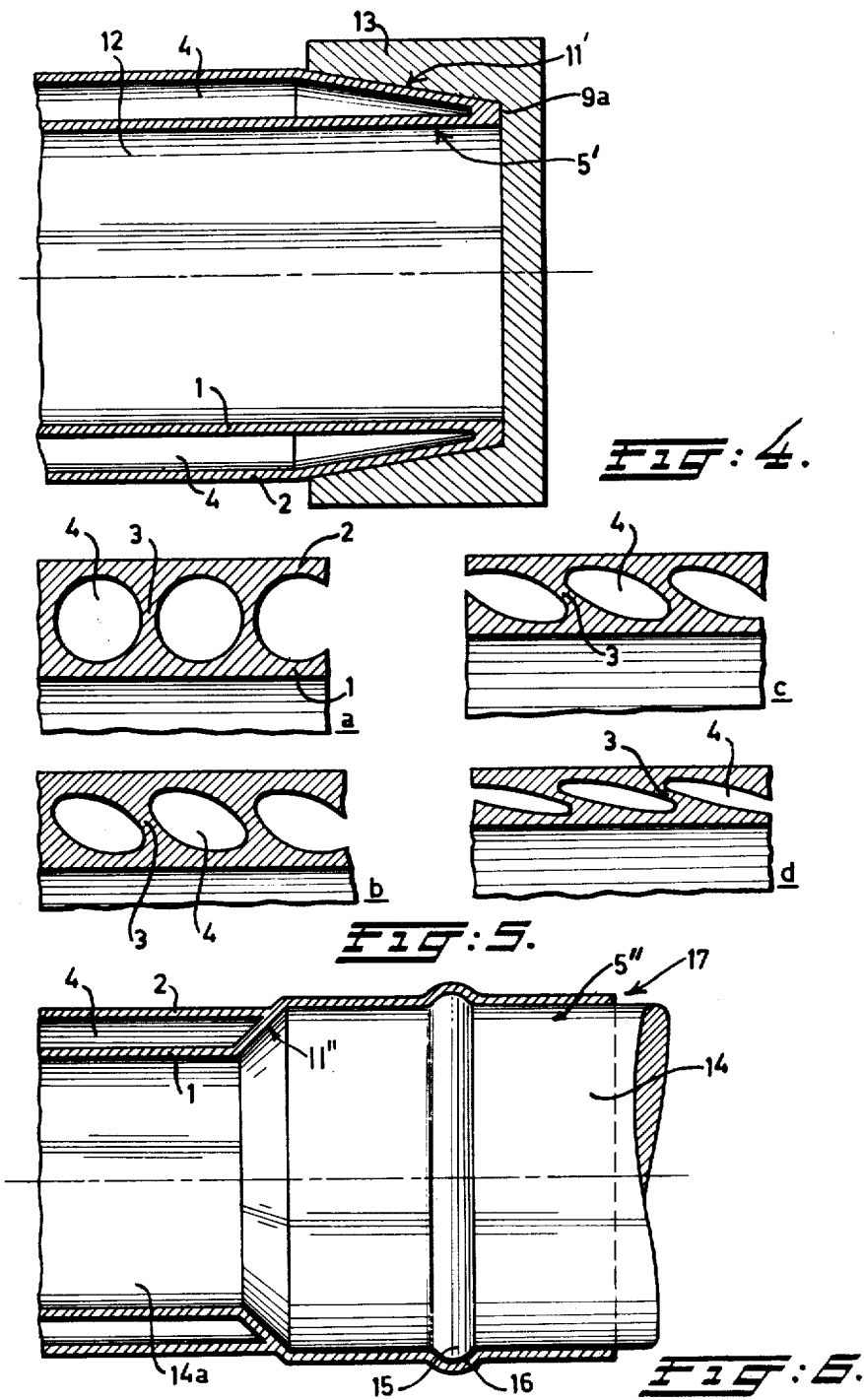

METHOD OF MAKING PLASTIC PIPES HAVING WALLS WITH LENGTHWISE EXTENDING CHANNELS

This is a division of application Ser. No. 904,218 filed May 9, 1978, now U.S. Pat. No. 4,280,534, and a continuation of Ser. No. 728,117, filed Sept. 30, 1976, now abandoned.

BACKGROUND OF THE INVENTION

This invention relates to plastic pipes comprising an inner wall and an outer wall which are interconnected by lengthwise extending connecting partitions forming lengthwise extending channels.

Such plastic pipes with lengthwise extending channels which are delimited by an inner and an outer wall are known per se.

When in use in pipe lines, the outer wall may be damaged so that ground water can penetrate through openings or cracks in said outer wall into the lengthwise extending channels. This groundwater then mixes with waste liquids transmitted by the aforementioned pipe lines.

Plants for sewage purification which purify the sewage water supplied by the pipe lines can thus be loaded with large quantities of groundwater which need not be purified.

In case of damage or openings in the outer wall, waste water from the pipe lines may also flow into the continuous channels and issue via these continuous channels and openings or cracks in the outer wall, which gives rise to serious pollution of the soil.

SUMMARY OF THE INVENTION

The present invention provides a plastic pipe of the aforementioned type which is not subject to the above-mentioned disadvantages.

Each channel is provided with a channel closing wall which ends at some distance from the nearest free end of the pipe, from which it follows that each channel is individually closed. This solution prevents liquid from issuing from the pipe line or entering the pipe line when the outer wall is damaged. This can never be achieved by using a cap, since in case of damage to such a cap the channels would also be subject to passing liquid.

Each channel closing wall is advantageously part of a projection mounted on a ring, which ring extends to beyond the aforementioned free end of the plastic pipe. For the purpose of introducing such a pipe into a socket, one end part of this ring is conveniently beveled.

The channel closing wall consists of a plastic wall integral with the pipe, obtained by pressing the channel walls against each other at the end of a channel.

As the channel closing wall is integral with the pipe body, leakage of liquids through the lengthwise extending channels is entirely eliminated.

The pipe is advantageously provided with a socket end and optionally with a groove for accommodating a sealing member.

The invention relates in another aspect to a method for manufacturing a plastic pipe comprising an inner wall and outer wall which are connected by lengthwise extending connecting partitions forming lengthwise extending channels. At the ends of a channel, its walls, after having been heated to above the plasticizing temperature, are pressed sealingly against each other, which operation provides a plastic pipe having efficiently sealed longitudinal channels.

When pressing the walls of a channel against each other, after heating to above the plasticizing temperature, the end of the pipe is subjected to a rotary motion, which is advantageous in that, when the channels are closed, the risk of creases is entirely avoided.

In order to subject the pipe to a rotary motion after its end has been heated, it is slid into a mandril having a flange arranged from outside which conically tapers toward the free end of the pipe. Simultaneously a small rotation is imparted to the flange.

Because of this small rotation the cross sections of the continuous channels gradually deform until the walls of a channel adjoin each other entirely.

When the channels are sealed by heating the plastic material to above the plasticizing temperature and pressing the channel walls to each other, the pipe can advantageously be provided with an end socket by widening the former.

BRIEF DESCRIPTION OF THE DRAWINGS

FIG. 1 is a perspective view of a known plastic pipe with lengthwise extending non-sealed channels;

FIG. 2 is a cross section of a first embodiment of a pipe according to the invention having sealed channels by means of channel closing walls;

FIG. 3 is a cross section through a sealing in a pipe of FIG. 2, in order to obtain channel closing walls in each of the channels;

FIG. 4 is another embodiment of a plastic pipe according to the invention with sealed ends of the lengthwise extending channels;

FIGS. 5a to 5d show details of the cross sectional shape of the channel openings of a pipe according to the invention when a conical rotating closing ring is used; and FIG. 6 is a pipe according to the invention having a socket with an inner groove.

DESCRIPTION OF A PREFERRED EMBODIMENT

The perspective view in FIG. 1 shows a known plastic pipe comprising an inner wall 1 and an outer wall 2 interconnected by lengthwise extending connecting partitions 3 forming lengthwise extending channels 4. Although, in this embodiment the axis of the longitudinally extending channels is parallel to the axis of the plastic pipe this is not necessarily so, as the connecting partitions may be provided such that slightly spirally extending longitudinal channels are produced.

Plastic pipes of this type are known and can be used for conveying waste liquids, particularly in sewage disposal pipe lines. However, they present the disadvantage that liquid with components suspended therein can flow through the channels themselves. The latter construction is rather inconvenient when, e.g., the outer wall of such a pipe is more or less damaged, while the inner wall of the plastic pipe is not damaged.

Such a situation may easily arise since these known pipes are manufactured particularly in order to decrease the consumption of plastic material in the pipes, especially by forming a thin inner wall 1 and a thin outer wall 2.

When, for instance the outer wall 2 is more or less damaged, liquid can easily penetrate through the lengthwise extending channels 4 into the pipe lines. The purification plants then have to purify more sewage water than the pipelines normally transmit. Specifically, groundwater can flow into a pipe line through channels 4 when they are open and thereby mix with sewage water.

Water purification already consumes much energy, which consumption increases significantly when the liquid to be purified contains groundwater. In cases of damage to the outer wall 2 when the lengthwise extending channels 4 are open, a second possibility is that liquids will issue from the pipe line through the channels 4 and openings in the outer wall, which may cause serious soil pollution. So as to alleviate all the aforementioned difficulties, each channel has at its end 5 a channel closing wall 6, according to the present invention.

FIGS. 2 and 3 show a first embodiment of a plastic pipe according to the invention, that is to say, a plastic pipe with a channel closing wall 6. This channel closing wall 6 is an end wall 7 of a cylindrical projection 8 arranged on a ring 9. The cylindrical projections are situated at the ends 5 of the channels 4 and extend for a small part of their length, for example 1 or 2 millimeters, into the channels from their free ends 9a, which are nearest to the end wall 7.

In order to obtain a proper sealing, the cylindrical projections 8 may be provided with a sealing glue coat, but they can also be fused with the inner wall of a lengthwise extending channel having a cylindrical cross-section.

Ring 9 has a chamfered edge 11 on its front side 10 so that the pipe can more easily be used in a spigot and socket joint.

It is also possible to widen the part of the ring 9, situated outside the channels 4, so as to form a socket and to provide the latter with an inner groove for receiving sealing means. When the ends shown in FIG. 2, having a chamfer, and such a socket are combined, then such pipes can be sealingly interconnected, whereby any risk of liquid passing through the channels is eliminated.

The ring 9 with the cylindrical projections consists of the same plastic material as that of the pipes with lengthwise extending channels.

FIG. 4 shows another embodiment of a plastic pipe wherein at the ends 5' of a channel the walls of a channel are sealingly pressed against each other after having been heated above the plasticizing temperature.

In order to carry out such an operation, an end 5' of a plastic pipe with lengthwise extending channels between an inner and an outer wall is heated and thereupon slid into a mandril 12 after which a flange 13, conically tapering toward the end zone of the pipe, is slid over the outside of the pipe, so that the walls of the channels 4 are pressed together and the desired sealing is obtained.

In order to prevent the formation of creases during this operation, a small rotation is imparted to the flange 13 when sliding the same over the end of the plastic pipe. This rotation is taken up by the free part 9a, causing the partitions 3 to be gradually deformed. The cross-sections of the channels 4 initially deform into an elliptic shape, gradually becoming more elliptic. Finally, the walls completely contact each other and fuse owing to the temperature of the plastic material, while forming a sealing thereof. Due to the conical shape of the flange 13 a pipe with a beveled edge 11' in FIG. 4 and 11' in FIG. 6 is produced.

FIGS. 5a to 5d show details of the cross sectional shape of the channel opening of a pipe according to the present invention when the conical rotating flange is acting thereon.

Obviously, the channels are entirely confined in the proximity of the end zone 5' of the pipe due to the rotary motion, whereas the cross section of the channels as seen from said end 5' gradually increases.

Such a pipe with sealed end zones of the channels 4 has been found to be very convenient in practice.

FIG. 6 shows a slightly different embodiment of the plastic pipe having an end zone 5" widened by means of a widening pin or mandrel 14 having an annular elevation 15 by which a groove 16 is produced.

When the socket 17 is formed, a small rotation is imparted to the widening pin 14 in order to avoid the formation of creases in the plastic pipe.

In order to maintain the inside diameter of the pipe in the part which is not to be widened, the widening pin 14 has a pilot part 14a, the diameter of which corresponds to the inside diameter of the original plastic pipe.

The method described hereinbefore for sealing longitudinally extending channels by means of a ring 9 with cylindrical projections 8 advantageously lends itself to sealing channels at a building site where sawed-off pipe lengths are used which should be provided with a sealing in each of the longitudinally extending channels.

The operation of sealing the longitudinally extending channels by means of a mandril 12 and a flange 13 is more suitable when effected in factories.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. A method of manufacturing a pipe formed of a plastic material, said pipe comprising an inner wall and an outer wall which are interconnected by a plurality of connecting partitions extending lengthwise of said pipe, said plurality of connecting partitions forming a plurality of lengthwise extending channels, comprising the steps of:

heating one end of the pipe to a temperature above the plasticizing temperature of the plastic material; and pressing one of said inner and outer walls against the other at said heated one end of the pipe to sealingly fuse the inner and outer walls together and thereby form a beveled edge on said one end of the pipe.

2. The method according to claim 1, including the step of subjecting said heated one end of the pipe to a rotational force.

3. The method according to claim 1, wherein said pressing step includes the substep of pressing said outer wall toward said inner wall to form a conically converging beveled edge.

4. The method according to claim 1, wherein said pressing step includes the substep of pressing said inner wall toward said outer wall to form a conically diverging beveled edge.

5. The method according to claim 1, wherein said pressing substep includes the step of urging a mandrel axially against said heated one end of the pipe.

6. The method according to claim 5, wherein said urging substep includes the substep of rotating said mandrel while forming said beveled edge.

7. The method according to claim 5, wherein said pressing step includes the substep of urging said mandrel axially inwardly of the heated one end of the pipe to form said beveled edge and a cylindrical socket at said heated one end of the pipe.

8. The method according to claim 7, wherein said pressing step includes the substep of urging said mandrel with an annular elevation to form an annular groove inside said socket.

9. The method according to claim 7, wherein said pressing step includes the substep of urging said mandrel with a pilot part against the inner wall of the pipe, said pilot part corresponding to the inside diameter of the pipe in order to maintain said inside diameter of the pipe during said urging substep.

* * * * *